July 9, 1929. R. CHAVAND 1,720,166
LINK BELT
Filed Dec. 8, 1926 2 Sheets-Sheet 1

Inventor:
René Chavand
By
Attorney

July 9, 1929.  R. CHAVAND  1,720,166
LINK BELT
Filed Dec. 8, 1926   2 Sheets-Sheet 2
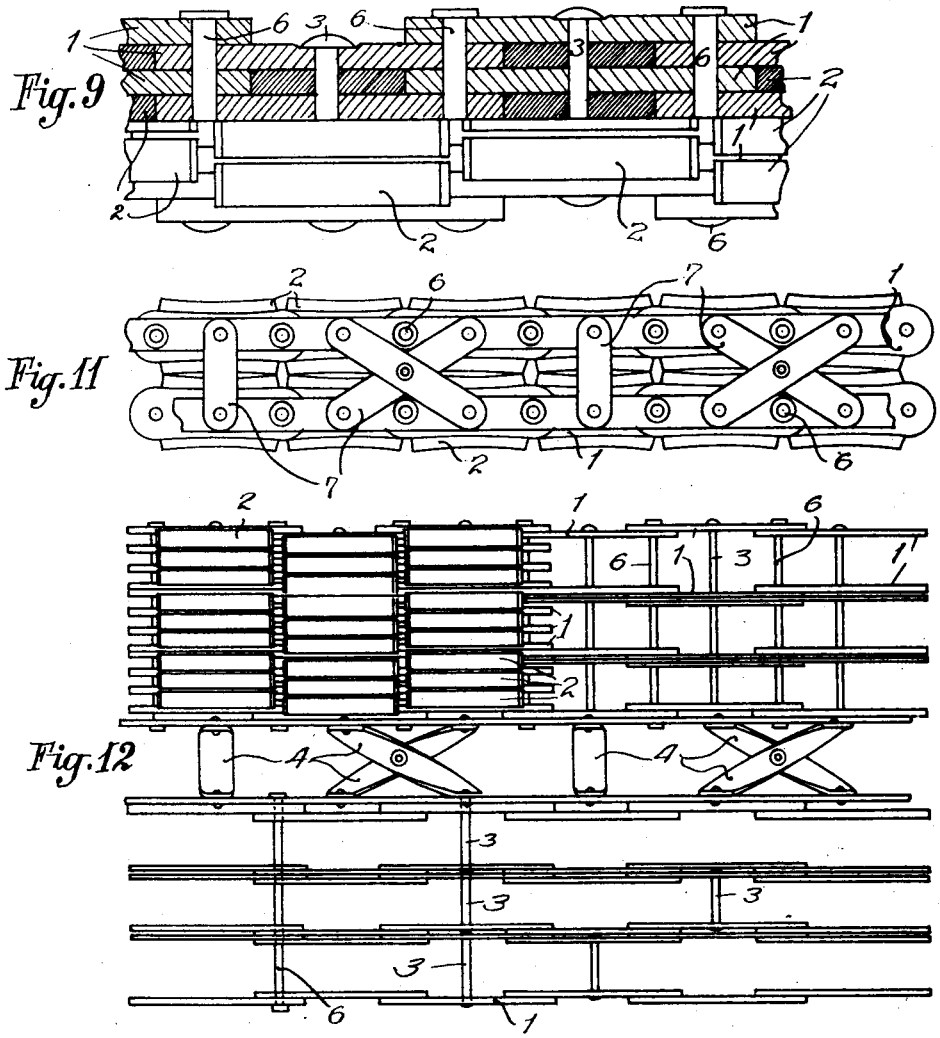
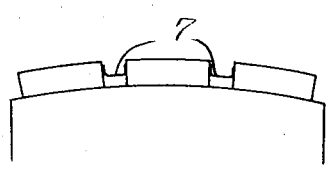
Inventor:
René Chavand Patented July 9, 1929.

1,720,166

UNITED STATES PATENT OFFICE.

RENÉ CHAVAND, OF LYON, FRANCE.

LINK BELT.

Application filed December 8, 1926, Serial No. 153,427, and in France December 22, 1925.

This invention refers to link belts comprising in combination two kinds of members, some being intended for supporting the traction and the others being intended for sticking on the rim of the pulleys and avoiding slipping.

According to the invention the tractive members are articulated on the link pins without any interposition of adhesive members, the latter members being inserted between the successive tractive members of the same link, in the space between the two pins of the link. The adhesive members are curved in order to obtain a better and more regular contact on the pulleys and they are preferably made of highly oiled chromated leather, the tractive members being made of micarta or similar boards formed of paper impregnated under pressure with artificial resins such as bakelite.

Figure 1:
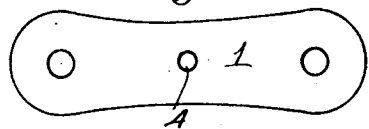
Fig. 1 is a side view of a tractive member.
Figure 2:
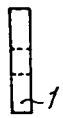
Fig. 2 is an end view of the same.
Figure 3:
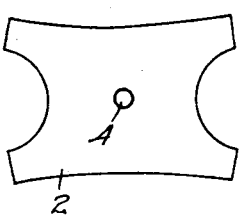
Fig. 3 is a side view of an adhesive member.
Figure 4:
Fig. 4 is an end view of the same.
Figure 5:
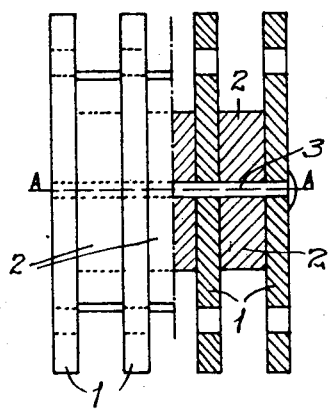
Figure 6:
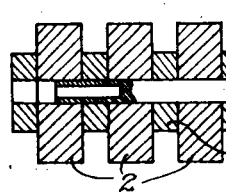
Figure 7:
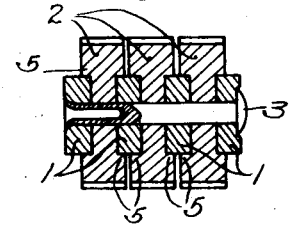
Figure 8:
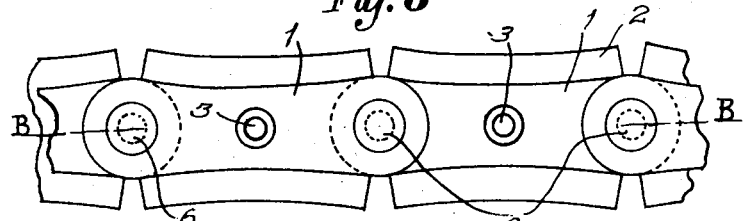
Figure 10:
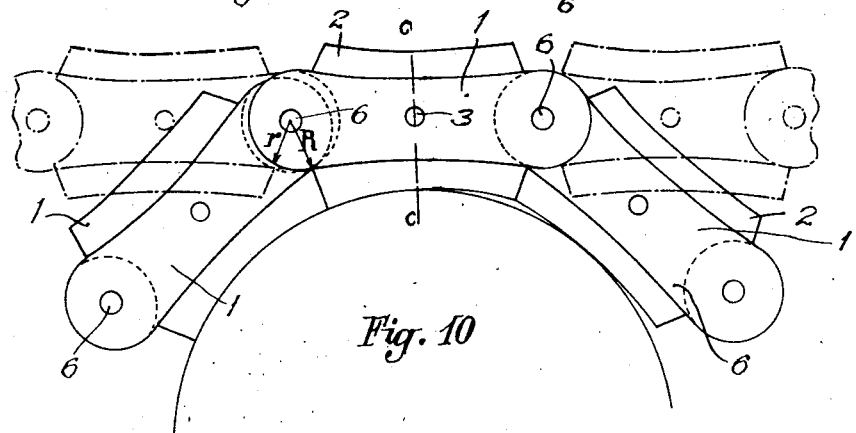

Fig. 5 is a part-sectional plan view of a link, as it appears when the parts are put together before riveting under pressure, Fig. 6 is a cross-section of the same on line A—A (Fig. 5), Fig. 7 is a cross-section similar to Fig. 6, but after riveting under pressure, Fig. 8 is a side view of the belt, Fig. 9 is a plan view of the same with parts in section on line B—B (Fig. 8), Fig. 10 shows the winding of such a belt on a pulley of smaller diameter, Figs. 11 and 12 represent a belt for wide pulleys, Fig. 13 indicates how such a belt is curved on a crowned pulley.

Figs. 1 to 4 clearly show the two kinds of members employed, 1 being a tractive member, made of micarta, and 2 an adhesive member made of chromated leather. The parts being placed in correct position (Fig. 5), a rivet 3 is inserted in the holes 4 and pressure is applied on the link. Members 1 penetrate the yielding mass of members 2 and, after riveting, the link appears as shown in Fig. 7, a sort of shoulder 5 being formed in the faces of members 2.

The links are assembled together by means of pins 6 on which only members 1 are articulated (see Fig. 8). Of course, the belt may comprise several parallel links articulated on the same pin, as is well-known in the construction of chains.

The curved edges of members 2 give a great area of contact on the rim of the pulley (see Fig. 10, on the right of line C—C). The radius of this curve may be made variable (see Fig. 10, on the left of line C—C), by arranging the pin holes eccentrically in members 1 relatively to the centers of the semi-circular edges of said members. The distance between this edge and the axis of the pin thus varies when the belt is curved between $r$ and R and the yielding mass of members 2 is forced against the rim of the pulley.

When wide belts are to be used on crowned pulleys, two or more separate belts are assembled as shown in Fig. 11, by strips of leather 7. Fig. 12 schematically represents the belt obtained, the two belts being placed face against face in Fig. 11 to show the strips 7. In Fig. 13, the wide belt comprises three single belts and the self-adaption of such a belt on a crowned pulley is clearly illustrated in the figure.

In Fig. 12, some members 1 and 2 are omitted for the purpose of clearly showing the construction.

The belt according to the invention has the greatest strength obtainable for a given width, as the link pins 6 are driven through the tractive members 1 only, thus without loss of space for the adhesive members. As represented on the drawings, the thickness of the tractive members is preferably equal to the thickness of the adhesive members after riveting under pressure, the tractive members being thus exactly interleaved on the link pins. The area of contact on the rim of the pulley is also the maximum (see Fig. 7) and the adhesive properties of chromated leather are well-known. On the other hand, micarta has a very high tensile strength and its coefficient of friction on metal is very low; the wear on the link pins thus need not be taken into account. Micarta is also impervious to acids, oils and water and is not affected by heat; the belt may thus work in the worst conditions.

What I claim is:

1. A link belt formed of links comprising adhesive members made of relatively soft material and tractive members made of relatively hard material, and pins connecting the links; the adhesive members being thicker and wider than the tractive members, but shorter in length; said adhesive and tractive members being placed face to face in alternate relation and assembled under pressure so as to cause the tractive members to penetrate the mass of the adhesive members and thereby form shoulders in the faces of said adhesive members; whereby the free ends of the tractive members of two consecutive links may be interleaved and articulated on a link pin without interposition of soft material and without any loss in length on said pin.

2. A link belt as claimed in claim 1 in which the adhesive members are curved along their longitudinal edges in order to obtain a greater area of contact on a pulley of reduced diameter.

3. A link belt formed of links comprising tractive members and adhesive members, and pins connecting the links; the tractive members being outwardly curved at their ends and the adhesive members being inwardly curved along their four sides; said adhesive members being thicker and wider than said tractive members, but shorter in length; said adhesive and tractive members being placed parallel to each other in alternate relation and riveted together under pressure in such a way that the tractive members penetrate the mass of the adhesive members and thereby form shoulders in the faces of said adhesive members; the free ends of the tractive members of two consecutive links being interleaved and articulated on a link pin; the curve which terminates said tractive members being such that the edge of a tractive member of one link presses against the edge of the corresponding adhesive member of the other link with a pressure which increases when the belt is bent.

4. A link belt formed of links comprising in combination adhesive members made of material having adhesive properties and tractive members made of boards formed of sheets of paper impregnated under pressure with artificial resins such as bakelite.

5. A link belt formed of links comprising in combination adhesive members made of highly oiled chromated leather and tractive members made of boards formed of sheets of papers impregnated under pressure with artificial resins such as bakelite.

6. A link belt formed of links each comprising a plurality of tractive members and a plurality of flat adhesive members disposed parallel with each other in alternate relation, and pins connecting the successive links together at their ends; each adhesive member of a link being located between the two connecting pins of that link as well as between two adjacent tractive members thereof, so that said pins pass through said tractive members only.

7. A link belt formed of links comprising tractive members and adhesive members disposed parallel with each other in alternate relation, and pins connecting the successive links together at their ends; said tractive and adhesive members being assembled under pressure in such a way that the tractive members penetrate the mass of the adhesive members and thereby form shoulders in the faces of the same.

8. A link belt formed of links comprising tractive members and adhesive members disposed parallel with each other in alternate relation, and pins connecting the links; the adhesive members being located in the spaces between successive connecting pins so that the latter pass through the tractive members only; said tractive and adhesive members being assembled under pressure in such a way that the tractive members penetrate the mass of the adhesive members and thereby form shoulders in the faces of the same.

In testimony whereof I affix my signature.

RENÉ CHAVAND.